(12) United States Patent
Luster

(10) Patent No.: US 7,367,877 B1
(45) Date of Patent: May 6, 2008

(54) BIG GAME FIELD DRESSING TOOL AND METHOD

(76) Inventor: Michael A. Luster, 865 Toms River Rd., Jackson, NJ (US) 08527

( * ) Notice: Subject to any disclaimer, the term of this patent is extended or adjusted under 35 U.S.C. 154(b) by 0 days.

(21) Appl. No.: 11/538,888

(22) Filed: Oct. 5, 2006

Related U.S. Application Data

(60) Continuation-in-part of application No. 29/257,590, filed on Apr. 6, 2006, now Pat. No. Des. 539,868, which is a division of application No. 11/095,127, filed on Mar. 31, 2005, now abandoned.

(51) Int. Cl.
*A22B 5/00* (2006.01)
(52) U.S. Cl. ...................................... 452/102
(58) Field of Classification Search ................ 452/109, 452/116, 120, 121, 122, 176
See application file for complete search history.

(56) References Cited

U.S. PATENT DOCUMENTS

| | | | |
|---|---|---|---|
| 4,738,060 A * | 4/1988 | Marthaler et al. ............ 52/103 |
| 5,122,090 A * | 6/1992 | van de Nieuwelaar et al. .......................... 452/116 |
| 5,123,871 A * | 6/1992 | van den Nieuwelaar et al. .......................... 452/122 |
| 5,133,686 A * | 7/1992 | van den Nieuwelaar et al. .......................... 452/122 |
| 5,199,922 A * | 4/1993 | Korenberg et al. ......... 452/122 |
| 5,217,194 A * | 6/1993 | Brownell .................... 248/156 |
| 5,396,743 A * | 3/1995 | Bellette ...................... 52/154 |
| 5,564,232 A * | 10/1996 | Callaway ............................ 5/4 |
| 5,688,164 A * | 11/1997 | Mills et al. ................. 452/122 |
| 5,740,827 A * | 4/1998 | Swarringim ................ 135/118 |
| 6,210,263 B1 * | 4/2001 | Meyer ........................ 452/120 |
| 6,244,949 B1 * | 6/2001 | Moody ....................... 452/122 |
| 6,895,613 B1 * | 5/2005 | Clouston ....................... 5/417 |

* cited by examiner

*Primary Examiner*—Thomas Price
(74) *Attorney, Agent, or Firm*—McKee, Voorhees & Sease, P.L.C.

(57) ABSTRACT

A tool and method of using are disclosed for field dressing big game. The tool has a tip sized for insertion into the anus of the animal and a set of barbs extending a radial distance beyond the tip. The tip and the barbs are mounted to a shank and handle. Inserting the tip and barbs into the rectum causes radial stretching of the rectal wall, and rotation of the tool causes ensnarement of the rectum on the barbs. The tool is retracted from the anus, pulling a section of rectum external, to be closed for the prevention of leakage of bodily waste matter.

15 Claims, 5 Drawing Sheets

BIG GAME FIELD DRESSING TOOL AND METHOD

CROSS-REFERENCE TO RELATED APPLICATIONS

This application is a Continuation-in-part of Design application Ser. No. 29/257,590 filed Apr. 6, 2006, now U.S. Pat. No. D, 539,868 which is a Divisional Application of Ser. No. 11/095,127, now abandoned filed Mar. 31, 2005, which are herein incorporated by reference in their entirety.

FIELD OF THE INVENTION

The present invention relates to the field of tools and methods for dressing big game in the field.

BACKGROUND OF THE INVENTION

In the sport of hunting, for example deer hunting, after bringing down the animal, the hunter frequently dresses the animal in the field. Dressing a slain animal involves skinning the carcass and separating the meat from the visceral organs. A particular problem arises in the area of the anus, where the rectal portion of the lower intestine connects to the outer skin of the animal. The traditional method of dealing with this area is to cut around the anus with a knife to separate the anus and the rectum from the skin. The skin is then slit along the lower abdomen to open the body. This process presents the problem of damaging the intestinal wall, thereby allowing solid waste matter to enter the body cavity. When this happens, the meat that is contacted by the bodily waste material becomes contaminated and is not fit for consumption. In addition, the process of cutting around and separating the anus from the surrounding skin with a knife is arduous and time consuming.

One method and apparatus for cleanly removing the anus and extracting the rectum for safely tying and securing against contaminating leakage of solid waste is disclosed in U.S. Pat. No. 6,244,949 to Moody. The Moody invention provides an annular cutter device that is rotated around the animal's anus and pushed to cut a plug of flesh. A strip on the side of the cutter is then pressed radially inward to grip the cut plug, and the cutter is pulled out to extend the rectum from the body cavity. The rectum is then tied snugly to prevent leakage of waste matter while the abdomen is cut open and the viscera removed.

SUMMARY OF THE INVENTION

The present invention provides a tool for dressing big game, for example deer, in the field by pulling the rectum outwardly without cutting the flesh around the anus. The tool has a forwardly protruding tip portion surrounded by a set of barbs that extend radially beyond the tip. The tip and barbs are mounted to the distal end of a shank that has a handle mounted at its proximal end. In use, the tip is inserted into the anus of a slain animal as the handle is pushed to move the barbs into the body cavity. Once the barbs are beyond the anus, the handle is rotated sufficiently to cause the exposed points of the barbs to ensnare the wall of the rectum. The handle is then pulled back to remove the barbs and the tip of the tool from the body cavity of the animal, extracting a length of intestine. The exposed intestine is tied or clamped to prevent accidental spilling of body waste materials during the balance of the eviscerating and skinning process.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
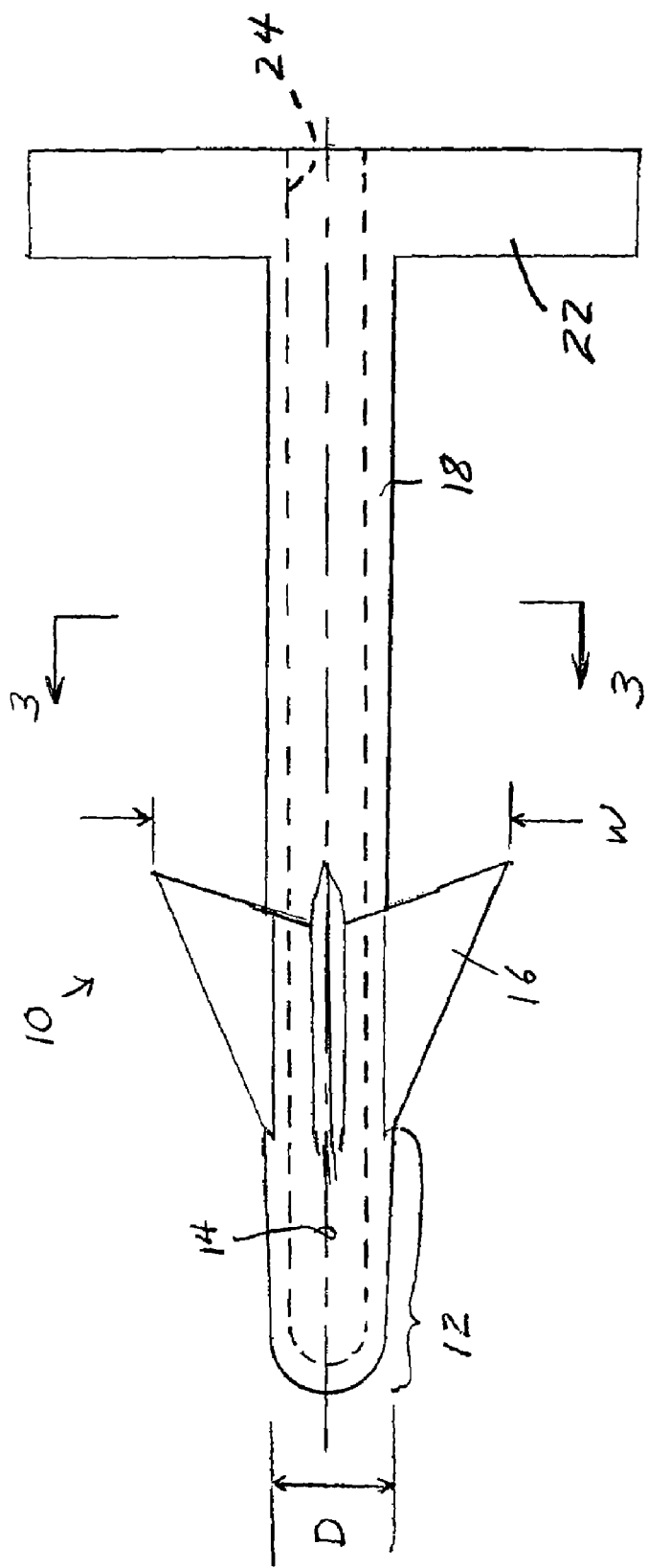
FIG. 1 is a side elevation view of the field dressing tool of the present invention according to a first embodiment.

Referring now to FIG. 1, a side elevation of the invention big game dressing tool 10 is illustrated according to the first preferred embodiment. Tool 10 is formed substantially symmetrically about axis 14. Tool 10 has a tip 12 that is substantially cylindrical in shape with a hemispherical portion at a first end thereof that is distal from a handle 22. A series of substantially triangular barbs 16 are formed in angularly dispersed positions around tip 12 to extend radially outwardly from the rear portion of tip 12. In the illustrated embodiment, tool 10 is formed with four barbs 16 (see FIG. 3), although different numbers of barbs 16 are contemplated within the scope of the invention. Tip 12 has a diameter D, and barbs 16 extend on opposite sides of axis 14 to a width W that is greater than diameter D. Diameter D is preferably sized for being inserted into the anus of a slain animal, for example a deer. In the preferred embodiments described herein, width W is at least twice as great as diameter D.

Referring further to FIG. 1, a shank 18 is substantially a coaxial extension of tip 12 along axis 14. Shank 18 terminates in handle 22 that is formed transverse to axis 14. In the first preferred embodiment, tip 12 and shank 18 share a hollow, cylindrical bore 24 so as to reduce the weight of tool 10 without significant sacrifice of rigidity. Handle 22 may be hollow or solid, depending on the material used. Shank 18 is formed sufficiently long to allow insertion of tip 12 and barbs 16 into the anus of the slain animal by at least 3-4 inches while the handle is being held by the user outside the body of the animal. It is preferred that tool 10 is manufactured by the process of plastics injection molding, with the choice of plastics resin to be determined by the manufacturer.

Figure 2:
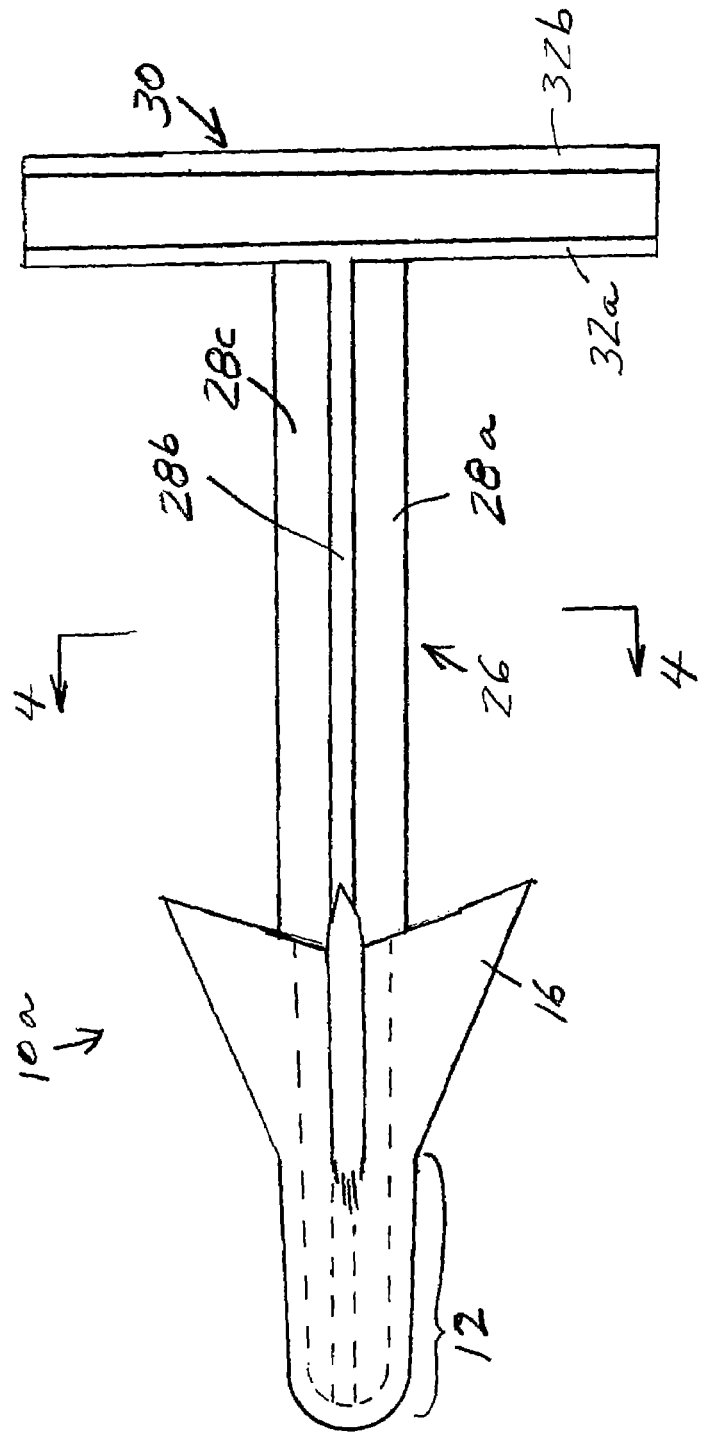
FIG. 2 is a side elevation view of the field dressing tool of the present invention according to a second embodiment.

Referring now to FIG. 2, tool 10a is formed with a tip portion 12 and barbs 16 similar to that described above in reference to FIG. 1. Shank 26 is connected coaxially to tip 12 at the proximal end thereof. Shank 26 is formed as an orthogonal cross of ribs 28a-28d, as seen more clearly in FIG. 4 described below. Shank 26 connects at its proximal end to handle 30, formed in cross section (not shown) in the form of the letter "H." In a further embodiment of tool 10, the handle is a linear extension of shank 26, and may have a transverse hole for gripping or carrying.

Figure 3:
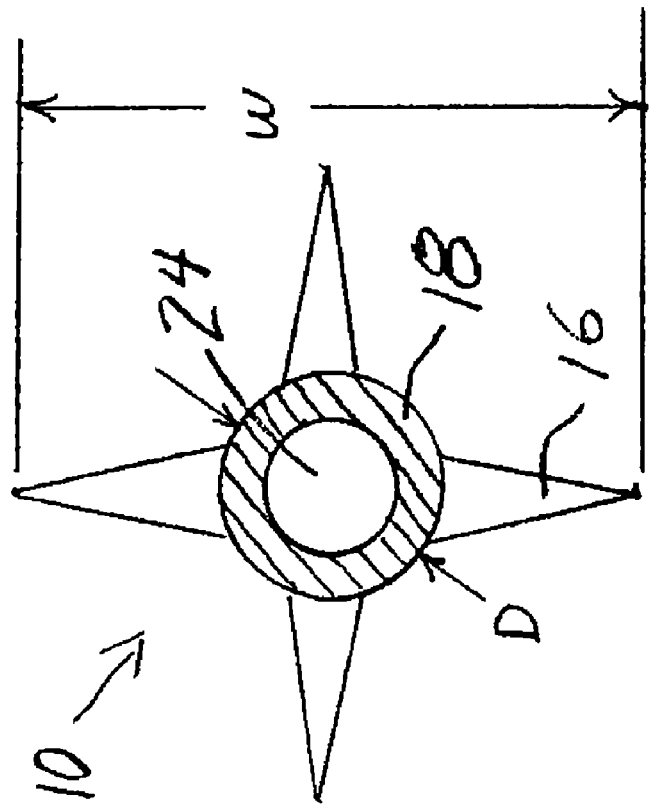
FIG. 3 is a cross sectional view of the first embodiment taken in the direction indicated by line 3-3 of FIG. 1.

Referring now to FIG. 3, a cross section of tool 10 is shown in the direction indicated by line 3-3 of FIG. 1. The relation between the diameter D of hollow shank 18 and the width W across the tips of barbs 16 is clearly shown. Bore 24 extends through shank 18 and tip 12 (see FIG. 1). In the preferred embodiment, barbs 16 extend radially outward from shank 18.

Figure 4:
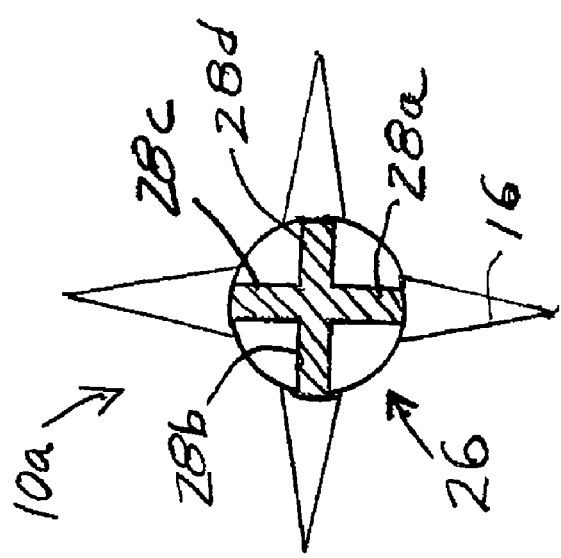
FIG. 4 is a cross sectional view of the second embodiment taken in the direction indicated by line 4-4 of FIG. 2.

FIG. 4 illustrates the cross section of tool 10a as indicated by line 4-4 of FIG. 2 with shank 26 having a plurality of ribs 28a-28d formed in orthogonal assembly. As described above with respect to barbs 16, different numbers of ribs 28 may be employed, preferably not less than 3 for reasons of rigidity.

Figure 5:
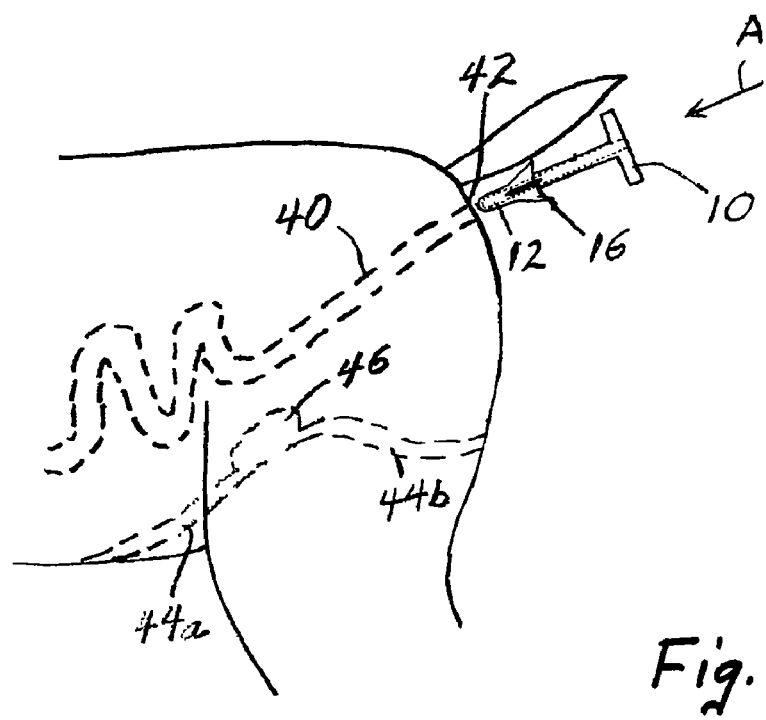
FIG. 5 is a side elevation view of the rear portion of a slain large animal with the present invention tool positioned for use.

Referring now to FIG. 5, the method of use of big game field dressing tool 10 is illustrated in sequential steps. A side elevation view of the rear portion of a slain large animal, such as a deer, is illustrated in each figure with selected internal organs depicted in dashed lines. The animal's rectum 40, being the last section of intestine, connects to the anus 42 at the animal's rump. The internal end of rectum 40 continues as intestines that ultimately terminate at the stomach (not shown). Tool 10 is positioned in FIG. 5 in alignment with anus 42 with its tip 12 adjacent to anus 42. Tool 10 is to be pushed in the direction indicated by arrow A until tip 12 and barbs 16 have passed anus 42 and entered rectum 40 to be in the position shown in FIG. 6. A bladder 46 and a urethra (44A in the case of a buck or 44B in the case of a doe) are shown as an additional source of waste contamination, although they are not direct objects of the present invention.

Figure 6:
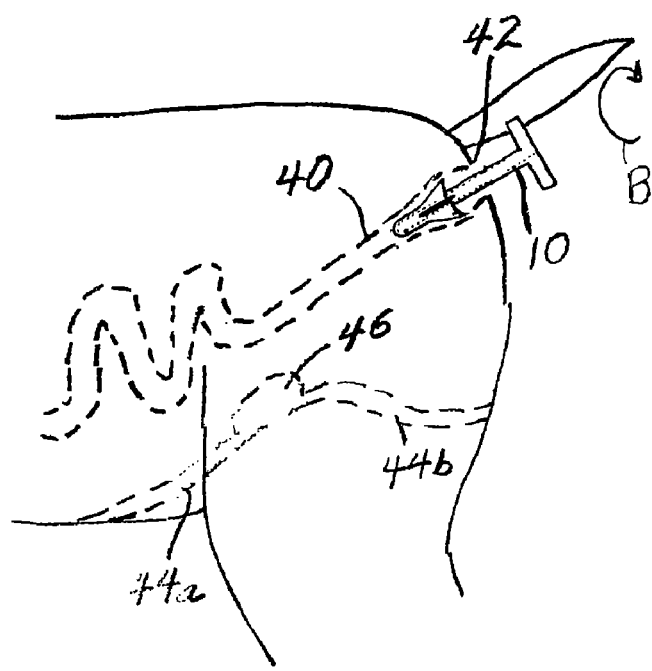
FIG. 6 is the view of FIG. 5 with the present invention tool inserted into the anus of the slain animal.

As illustrated in FIG. 6, rectum 40 is stretched radially to accommodate and engage barbs 16 therein. Tool 10 is next rotated as indicated by arrow B through an angle of approximately 180°. Since barbs 16 are formed along a series of perpendicular planes that pass through axis 14 of tool 10 (see FIG. 1), rotation of tool 10 can be either clockwise or counterclockwise. In an alternate version of the invention, barbs 16 may be formed along a series of planes that are tangent to the periphery of tip 12, in which case tool 10 must be rotated in a direction to cause barbs 16 to hook into rectum 40. With the extended sharp points of barbs 16 stretched over the membrane comprising rectum 40, rotation of tool 10 causes barbs 16 to dig into and ensnare the wall of rectum 40.

Figure 7:
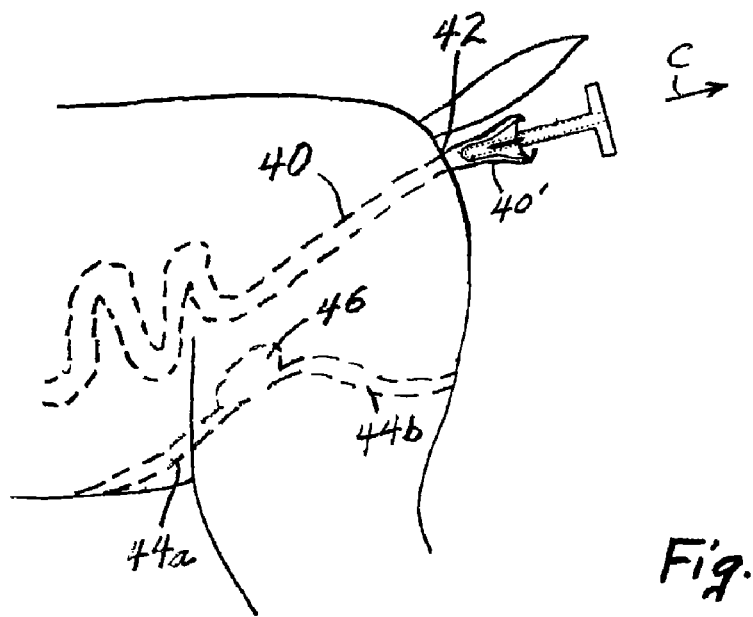
FIG. 7 is the view of FIG. 6 with the present invention tool withdrawn from the anus of the slain animal with a portion of intestine.

Referring now to FIG. 7, tool 10 is withdrawn in the direction indicated by arrow C from the animal's anus 42, drawing a section of rectum 40' outside anus 42. In order to enable tying or clamping of rectum 40', tool 10 is pulled out of anus 42 by a distance of 10-12 inches. Tool 10 is removed from the rectum by cutting the intestinal wall either before or after clamping is done, as described below.

Figure 8:
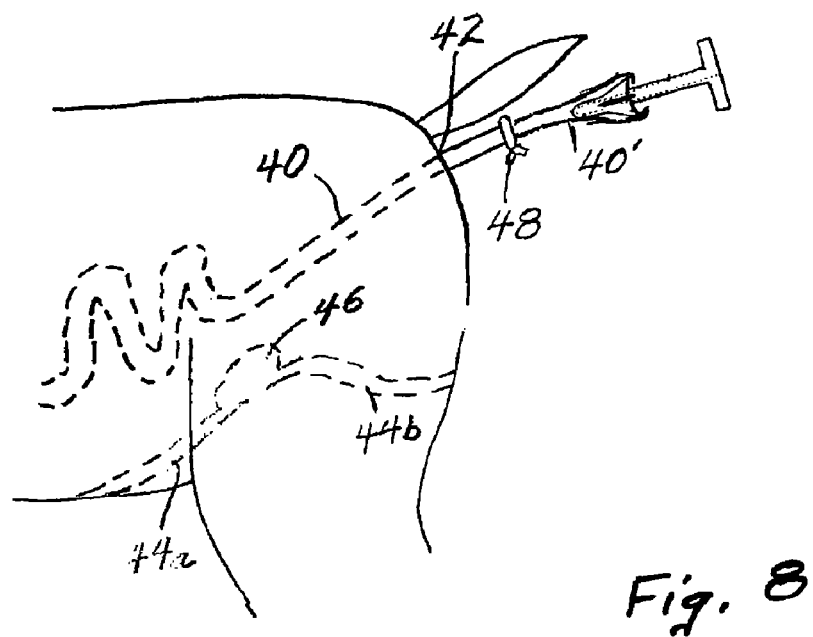
FIG. 8 is the view of FIG. 7 with the present invention tool holding a section of withdrawn and tied intestine of the slain animal.

Referring now to FIG. 8, the extended section of rectum 40' is then tied into a knot 48. In an alternate method a clamp (not shown), for example a cord, is applied and pulled tight enough to prevent solid waste from escaping from rectum 40' during the balance of the process of eviscerating the slain animal. Twisting rectum 40' outside the body cavity of the animal prior to clamping serves to further prevent waste leakage.

With the intestines tied or clamped to prevent waste leakage, the process of dressing the slain animal proceeds. The extended section of rectum is repositioned in the body cavity either by pushing the extended section through the anus or pulling the extended section from within after the lower abdominal skin has been opened. The intestines and the balance of the digestive tract are then removed through the abdominal opening, together with the bladder and urethra.

While the description above discloses preferred embodiments of the present invention, it is contemplated that numerous variations and modifications of the invention are possible and are considered to be within the scope of the claims that follow.

What is claimed is:

1. A method of removing at least a portion of a rectum from the body cavity of a slain big game animal in field dressing the animal that helps prevent accidental spilling of waste matter into the body cavity, the method comprising:
   providing a field dressing tool including a tip portion, a plurality of barbs extending radially and rearwardly from the tip portion, a shank affixed to a rear portion of the barbs and a handle;
   inserting the tip portion and the barbs into the rectum of the animal so that the barbs cause the rectum to stretch radially;
   rotating the handle to cause the barbs to ensnare the rectum; and
   retracting the barbs and tip portion from the animal to extend a portion of the rectum.

2. The method of claim 1 further comprising the step of closing the extended portion of the rectum to prevent the leakage of waste therefrom.

3. The method of claim 2 wherein the step of closing the extended portion of rectum comprises tying the extended portion of rectum.

4. The method of claim 2 wherein the step of closing the extended portion of rectum comprises clamping the extended portion of rectum.

5. The method of claim 2 further comprising the step of twisting the extended portion of rectum after retracting the barbs and tip portion from the animal and prior to closing.

6. A method for using a big game field dressing tool comprising a tip portion, a plurality of barbs extending radially and rearwardly from the tip portion, a shank affixed to a rear portion of the barbs and a handle, the method comprising:
   inserting the tip portion and the barbs into the rectum of a slain animal so that the barbs cause the rectum to stretch radially;
   rotating the handle to cause the barbs to ensnare the rectum;
   retracting the barbs and tip portion from the animal to extend a portion of the rectum; and
   closing the extended portion of the rectum to prevent the leakage of waste therefrom.

7. The method of claim 6 wherein the step of rotating the handle comprises rotating the handle through an angle of approximately 180°.

8. The method of claim 6 wherein the step of closing the extended portion of the rectum comprises tying the extended portion of the rectum.

9. The method of claim 6 wherein the step of closing the extended portion of the rectum comprises clamping the extended portion of the rectum.

10. The method of claim 6 further comprising the step of twisting the extended portion of rectum after retracting the barbs and tip portion from the animal and prior to closing.

11. A tool for dressing big game in the field, comprising:
- a forwardly extending tip portion having a distal end configured for insertion into the anus of a slain animal and a proximal end spaced from the distal end;
- a plurality of barbs affixed to the proximal end of the tip portion and extending radially and rearwardly from the tip portion;
- an elongate shank affixed to a rear portion of the barbs and sized to permit a portion of each barb to extend radially beyond the shank; and
- a handle fixedly mounted to a rear portion of the shank so that movement of the handle results in substantially equal movement of the tip portion, barbs and shank.

12. The tool for dressing big game in the field as described in claim 11, wherein the plurality of barbs are dispersed substantially equally angularly around the tip portion.

13. The tool for dressing big game in the field as described in claim 11, wherein the plurality of barbs comprises four barbs.

14. The tool for dressing big game in the field as described in claim 11, wherein the handle is formed perpendicular to the shank.

15. The tool for dressing big game in the field as described in claim 11, wherein the shank is formed with orthogonally connected ribs.

* * * * *